United States Patent
Yung et al.

(10) Patent No.: US 9,264,221 B2
(45) Date of Patent: Feb. 16, 2016

(54) SYSTEMS AND METHODS FOR FASTER PUBLIC KEY ENCRYPTION USING THE ASSOCIATED PRIVATE KEY PORTION

(71) Applicant: GOOGLE INC., Mountain View, CA (US)

(72) Inventors: Marcel M. M. Yung, New York, NY (US); Sarvar Patel, Montville, NJ (US)

(73) Assignee: GOOGLE INC., Mountain View, CA (US)

( * ) Notice: Subject to any disclaimer, the term of this patent is extended or adjusted under 35 U.S.C. 154(b) by 44 days.

(21) Appl. No.: 14/170,436

(22) Filed: Jan. 31, 2014

(65) Prior Publication Data

US 2015/0222422 A1    Aug. 6, 2015

(51) Int. Cl.
*H04L 9/30* (2006.01)
*H04L 9/06* (2006.01)

(52) U.S. Cl.
CPC ............... *H04L 9/0618* (2013.01); *H04L 9/30* (2013.01); *H04L 9/302* (2013.01); *H04L 2209/125* (2013.01)

(58) Field of Classification Search
CPC . H04L 9/3247; H04L 9/3013; H04L 2209/20; H04L 9/3066; H04L 9/0618; H04L 9/30
USPC ...................................... 380/30, 44, 283–285
See application file for complete search history.

(56) References Cited

U.S. PATENT DOCUMENTS

| | | | |
|---|---|---|---|
| 6,052,466 A | 4/2000 | Wright | |
| 6,480,605 B1* | 11/2002 | Uchiyama et al. | 380/30 |
| 7,630,493 B2 | 12/2009 | Sandhu et al. | |
| 7,664,259 B2 | 2/2010 | Frosik et al. | |
| 2001/0002486 A1* | 5/2001 | Kocher et al. | 713/171 |
| 2002/0041683 A1* | 4/2002 | Hopkins | H04L 9/302 380/28 |
| 2002/0064278 A1 | 5/2002 | Lim et al. | |
| 2009/0003597 A1* | 1/2009 | Gantman et al. | 380/44 |
| 2010/0177886 A1* | 7/2010 | Futa | G06F 7/723 380/28 |

FOREIGN PATENT DOCUMENTS

| | | |
|---|---|---|
| WO | 00/22496 | 4/2000 |
| WO | 00/65770 | 11/2000 |

OTHER PUBLICATIONS

Bernstein, D. J., Pippenger's Exponentiation Algorithm, Dept. of Mathematics, Statistics, and Computer Science (M/C 249), The University of Illinois at Chicago, IL, 21 pgs, [online] [retrieved on Nov. 25, 2013] URL: http://cr.yp.to/papers/pippenger.pdf.

(Continued)

*Primary Examiner* — Amir Mehrmanesh
(74) *Attorney, Agent, or Firm* — Procopio, Cory, Hargreaves & Savitch LLP (57) ABSTRACT

Systems and methods for faster public key encryption using the associated private key portion are described, including encrypting a plaintext into a ciphertext, where the encrypting uses a public key and a corresponding private key; and storing the ciphertext.

9 Claims, 5 Drawing Sheets

(56) References Cited

OTHER PUBLICATIONS

Paillier, P., Public-Key Cryptosystems Based on Composite Degree Residuosity Classes, Advances in Cryptology—EUROCRYPT '99, Lecture Notes in Computer Science, 1592, 1999, 15 pgs, [online] [retrieved on Nov. 25, 2013] URL:http://www.google.com/url?sa=t&rct=j&q=&esrc=s&source=web&cd=1&ved=0CCkQFjAA&url=http%3A%2F%2Fpaillier-cryptosystem.googlecode.com%2Fsvn-history%2Fr16%2Fdoc%2FPai99pai.pdf&ei=cADrUtSIEuLmyQHqhoHIBw&usg=AFQjCNHWNXSiX9apurBk1BJzCP2Mp_e_Zw&bvm=bv.60444564,d.aWc.

Tandrup, M. B., et al., Fast Exponentiation in Practice, Dec. 6, 2004, 21 pgs. [online] [retrieved on Nov. 25, 2013] URL: http://download2.net/f/fast-exponentiation-in-practice---daimi-computer-science-in-w1506-pdf.pdf.

Digital Signature, Wikipedia.com, 9 pgs, Jan. 26, 2014, [online] [retrieved on Jan. 30, 2014] URL: http://en.wikipedia.org/wiki/Digital_signature.

Prime Number, Wikipedia.com, 21 pgs, Nov. 21, 2013, [online] [retrieved on Nov. 25, 2013] URL: http://en.wikipedia.org/wiki/Prime_number.

Modular Multiplicative Inverse, Wikipedia.com, 3 pgs, Sep. 29, 2013, [online] [retrieved on Nov. 25, 2013] URL: http://en.wikipedia.org/wiki/Modular_multiplicative_inverse.

Quotient, Wikipedia.com, 2 pgs, Nov. 25, 2013, [online] [retrieved on Nov. 25, 2013] URL: http://en.wikipedia.org/wiki/Quotient.

Homomorphism, Wikipedia.com, 6 pgs, Nov. 9, 2013, [online] [retrieved on Nov. 25, 2013] URL: http://en.wikipedia.org/wiki/Homomorphism.

Discrete Logarithm, Wikipedia.com, 3 pgs, Oct. 27, 2013, [online] [retrieved on Nov. 25, 2013] URL: http://en.wikipedia.org/wiki/Discrete_logarithm.

Binomial Theorem, Wikipedia.com, 11 pgs, Nov. 25, 2013, [online] [retrieved on Nov. 25, 2013] URL: http://en.wikipedia.org/wiki/Binomial_theorem.

Chinese Remainder Theorem, Wikipedia.com, 10 pgs, Nov. 21, 2013, [online] [retrieved on Nov. 25, 2013] URL:http://en.wikipedia.org/wiki/Binomial_theorem.

Exponentiation by Squaring, Wikipedia.com, 10 pgs, Oct. 14, 2013, [online] [retrieved on Nov. 20, 2013] URL: http://en.wikipedia.org/wiki/Exponentiation_by_squaring.

Addition-Chain Exponentiation, Wikipedia.com, 3 pgs, Nov. 11, 2013 [online] [retrieved on Nov. 25, 2013] URL: http://en.wikipedia.org/wiki/Addition-chain_exponentiation.

Extended Euclidean Algorithm, Wikipedia.com, 8 pgs, Nov. 19, 2013 [online] [retrieved on Nov. 25, 2013] URL: http://en.wikipedia.org/wiki/Extended_Euclidean_algorithm.

Bezout's Identity, Wikipedia.com, 4 pgs, Nov. 14, 2013, [online] [retrieved on Nov. 25, 2013] URL: http://en.wikipedia.org/wiki/B%C3%A9zout%27s_identity.

International Search Report and Written Opinion for PCT/US2015/013736 dated May 19, 2015, 12 pgs.

Menezes, A.J., et al., Handbook of Applied Cryptography, Chapter 2: Mathematical Background, CRC Press, Oct. 1, 1996, 40 pgs.

Menezes, A.J., et al., Handbook of Applied Cryptography, Chapter 8: Public-Key Encryption, CRC Press, Oct. 1, 1996, 38 pgs.

Paillier, P., Public-Key Cryptosystems Based on Composite Degree Residuosity Classes, Advances in Cryptology—EUROCRYPT '99, 1999, vol. 1592 of Lecture Notes in Computer Science, pp. 223-238.

* cited by examiner

SYSTEMS AND METHODS FOR FASTER PUBLIC KEY ENCRYPTION USING THE ASSOCIATED PRIVATE KEY PORTION

BACKGROUND

1. Field

The subject matter discussed herein relates generally to data processing and, more particularly, to systems and methods for faster public key encryption using the associated private key portion.

2. Related Background

In public key cryptography or asymmetric cryptography, a cryptosystem consists of three algorithms: one algorithm for key generation, which generates a private key maintained by the owner and a public key published by the owner to the public; one algorithm for encryption, which allows anyone who has access to the published public key to perform encryption using the public key; and one algorithm for decryption, which allows the owner having private key or "trapdoor" information to decrypt with the private key data encrypted using the public key.

In the RSA (Rivest, Shamir and Adleman) algorithm, for example, both the private key and the public key are generated using the two prime numbers. The owner knows the two prime numbers and can perform decryption using the prime numbers. The "public" (i.e., those who are provided with the public key, which is based on at least some form of composite of the two prime numbers) can perform encryption using the public key. The public cannot effectively factor the composite, and cannot perform decryption.

In certain scenarios, the party performing the encryption is also the owner of the private key. For example, the owner may want to encrypt data for transmission across a public network and/or storing at a third-party storage (e.g., cloud storage). The encrypted data can be retrieved later and decrypted by the owner.

SUMMARY

The subject matter includes methods for faster public key encryption using the associated private key portion are described, including encrypting a plaintext into a ciphertext, where the encrypting uses a public key and a corresponding private key; and storing the ciphertext.

The methods are implemented using one or more computing devices and/or systems. The methods may be stored in computer-readable media.

DETAILED DESCRIPTION

The subject matter described herein is taught by way of example implementations. Various details have been omitted for the sake of clarity and to avoid obscuring the subject matter. The examples shown below are directed to structures and functions for implementing systems and methods for faster public key encryption using the associated private key portion.

Figure 1:
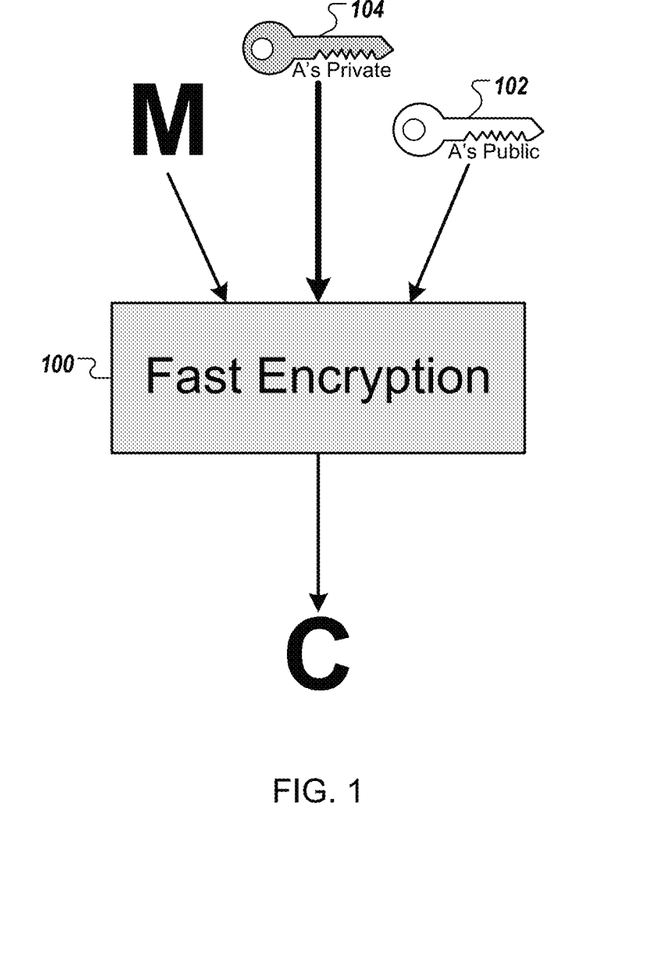
FIG. 1 shows a high-level diagram of fast encryption implementations.

FIG. 1 shows a high-level diagram of fast encryption implementations. An example fast encryption 100 is implemented to use at least a portion of a public key 102 and at least a portion of the corresponding private key 104 (can be referred to as a decryption key) to encrypt data or a message M to produce ciphertext C. Fast encryption 100 may be a software module, a process, a software application, a hardware circuit, a physical device, or any combination thereof that implements one or more algorithms to perform encryption using at least a portion of public key 102.

Fast encryption 100 can be implemented in any cryptosystem, for encryption, authentication, digital signatures, etc., which uses a public key or the likes and a private key or the likes. Example algorithms that can be made faster using techniques describe herein include but are not limited to Transport Layer Security (TLS), Pretty Good Privacy (PGP), Rivest, Shamir and Adleman (RSA), homomorphic encryption (e.g., Paillier Encryption), and the likes. An algorithm may include key distribution or secret key distribution (e.g., using Diffie-Hellman key exchange, etc.).

As described in FIG. 2 below, ciphertext C may be equivalent to another ciphertext C2 encrypted using a conventional encryption algorithm that uses only the public key 102 to encrypt data. In other words, the same decryption engine can decrypt ciphertext C and ciphertext C2 and cannot distinguish whether C is encrypted using a fast encryption algorithm 100 or a conventional encryption algorithm.

Figure 2:
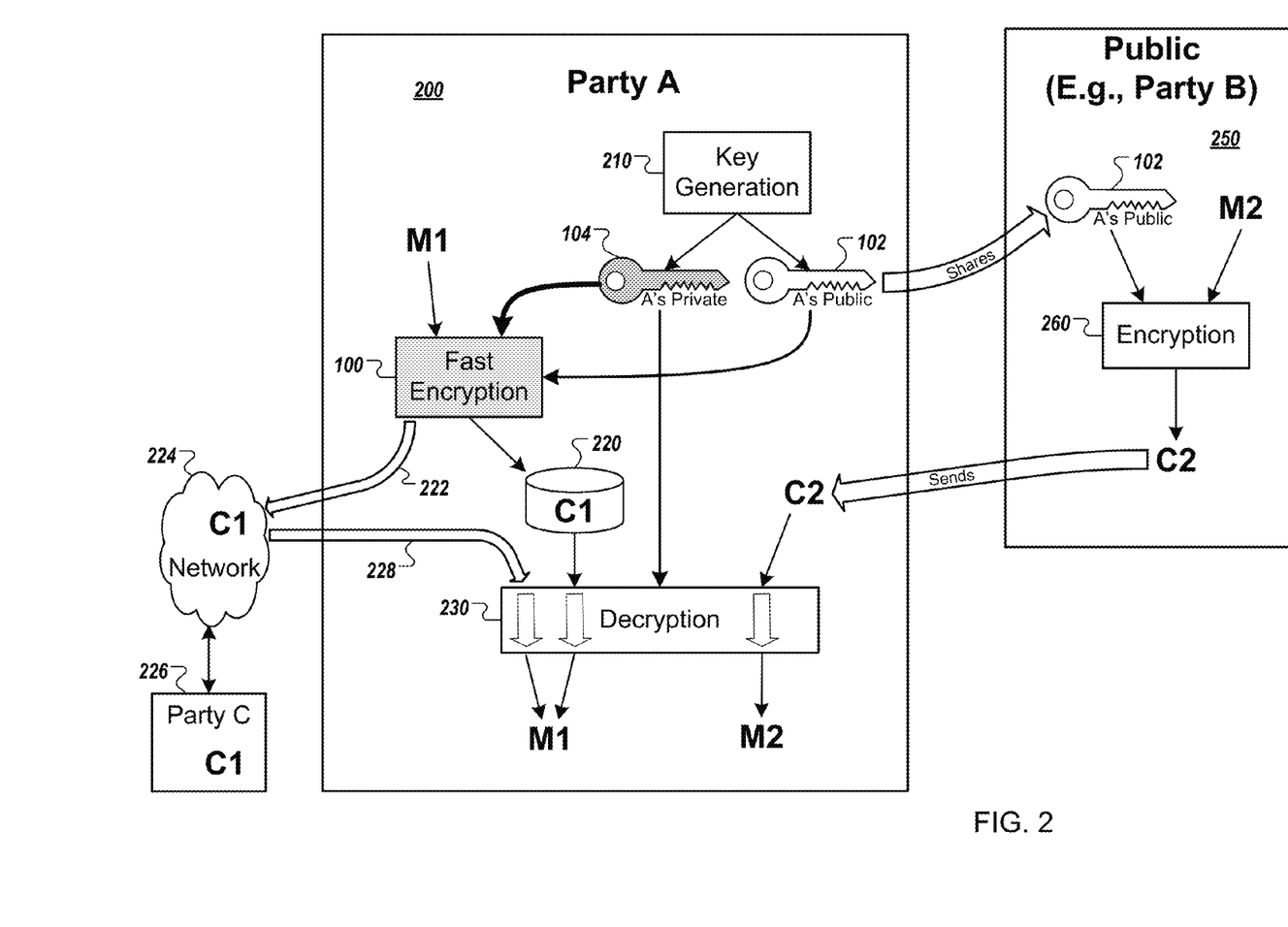
FIG. 2 shows an example environment where fast encryption implementations may be deployed.

FIG. 2 shows an example environment where fast encryption implementations may be deployed. Party A 200 (e.g., owner) uses key generation 210 to generate public key 102 and private key 104 (or decryption key 104). Key generation 120 may be a software module, a process, a software application, a hardware circuit, a physical device, or any combination thereof that implements one or more algorithms to generate keys. Public key 102 may be provided to any party (e.g., party B 250) that wishes to send owner 200 an encrypted message. Owner 200 uses private key 104 to decrypt messages encrypted with public key 102. Owner 200 also uses private key 104 or at least a portion of the private key 104 in one or more fast encryption or fast authentication algorithms.

Key generation 210 generates keys (e.g., public key 102 and private key 104) by, for example, computing or selecting two prime numbers p and q randomly and independently of each other. Implementations may use prime numbers p and q of equivalent length (e.g., 256 bits, 512 bits, 1024 bits, 2048 bits, a length that is not $2^x$, etc.). A greatest common divisor (i.e., gcd) may be computed to verify the property of gcd(pq, (p−1)(q−1))=1. To generate a public key (e.g., public key 102), key generation 210 computes n=pq and selects a random integer g, such as g=n+1, where g∈$\mathbb{Z}$*$n^2$; $\mathbb{Z}$*$n^2$={i∈ $\mathbb{Z}$:1<i<($n^2$−1) and gcd(i,$n^2$)=1}; and $\mathbb{Z}$ $n^2$={0, 1, . . . , ($n^2$−1)}. The public key is (n, g). The public key includes a composite number n that cannot be cracked or factored effectively to acquire p and q. The larger p and/or q are (e.g., the longer the length in bits), the harder it is to crack n.

A plaintext m can be encrypted into a ciphertext c using the formula c=($g^m$)($r^n$) mod $n^2$ in the example described herein, where m∈$\mathbb{Z}$ n and r is randomly select, and where r∈$\mathbb{Z}$ *n or r∈$\mathbb{Z}$ *$n^2$. $\mathbb{Z}$ n={0, 1, . . . , (n−1)}; and $\mathbb{Z}$ *n={i∈$\mathbb{Z}$ :1<i<(n−1) and gcd(i,n)=1}. The formula c=($g^m$)($r^n$) mod $n^2$ can be referred to as EQ1. The term "plaintext" or "m" (e.g., M as shown in FIG. 1, and M1 and M2 as shown in FIG. 2) as used herein refers to data, information, or a message to be encrypted. The "plaintext" or "m" may be in a form that is human readable or machine decipherable, or may be in a form that is not human readable or machine decipherable (e.g., previously encrypted).

Only the owner or the party doing the decryption knows or should know p and q. The private key may be easily generated once p and q are known. To generate the corresponding private key (e.g., private key 104, for decrypting ciphertexts encrypted using public key 102), key generation 210 computes $\lambda = \text{lcm}(p-1, q-1)$, where lcm is the least common multiple. Key generation 210 also computes $\mu = (L(g^\lambda \bmod n^2))^{-1} \bmod n$, where $L(\mu) = (\mu-1)/n$. The private (decryption) key is $(\lambda, \mu)$. The decryption formula in the example described herein is $m = L(c^\lambda \bmod n^2)\mu \bmod n$.

Another example way to generate the private key (e.g., $\lambda$ and $\mu$), if p and q are of equivalent length, is by computing $\lambda = \Phi(n) = (p-1)(q-1)$; $\mu = \Phi(n)^{-1} \bmod n$; and $g = n+1$.

For example, p and q can be 512 bit long numbers, and the resulting n can be a 1024 bit long composite number. If p and q are 1024 bit long primes, n in turn can be a 2048 bit long (this composite is referred to as "an RSA number").

Since only the owner or the party doing the decryption knows or should know p and q, only the owner (e.g., computing devices or systems of the owner) can perform encryption using p and/or q. Fast encryption 100 is, for example, implemented to use private key 104 or components of the private key (e.g., p and q) to speed up encryption.

As shown in FIG. 1, fast encryption 100 uses both a public key 102 and the corresponding private key 104 (or portion thereof) to encrypt data (e.g., a message M1) to produce ciphertexts (e.g., ciphertext C1).

The EQ1 encryption formula is $c = (g^m)(e) \bmod n^2$. If n+1 is used as g, then the encryption formula becomes $c = ((n+1)^m)(e) \bmod n^2$, which can be reduced to $c = (1+nm)(r^n) \bmod n^2$ (referred to as EQ2), due to binomial expansion of $(n+1)^m \bmod n^2$. In EQ2, one exponentiation (i.e., $g^m$) has eliminated, which may reduce computation time. EQ2 has only one remaining exponentiation (i.e., $r^n$).

The remaining exponentiation can be eliminated or its computation time reduced by using p and q. Pre-computation may be fast if the base is fixed and the exponent is varying. To speed up encryption using p and q (i.e., this can only be done by the owner of private key 104 who has knowledge of or access to p and q), the well-known Chinese Remainder Theorem (CRT) may be used to convert the "$(r^n) \bmod n^2$" portion of EQ2 to be able to perform pre-computation with a fixed base.

Note that $n^2 = p^2 q^2$. The operation of selecting a random r from the nth residue of $n^2$ can be replaced by selecting a random r1 from the nth residue of $p^2$ and selecting a random r2 from the nth residue of $q^2$. Using the CRT, r1 and r2 can be combined to get the nth residue of $p^2 q^2$ or $n^2$. Using the CRT, $(r^n) \bmod n^2 = (r^n) \bmod p^2 q^2$ can be converted to $(r1)^n \bmod p^2$ and $(r2)^n \bmod q^2$ for random r1 and r2, where $(r1)(r2) = r$; $r1 \in \mathbb{Z}^*p^2$; and $r2 \in \mathbb{Z}^*q^2$.

The value of r1 can be selected randomly by selecting a generator g1 of a cyclic group $\mathbb{Z}^*p^2$ of order $\Phi(p^2)$ and selecting a random element s1 from $\Phi(p^2)$ then computing $y1 = (g1)^{s1} \bmod p^2$. $\Phi(p^2)$ is Euler's totient or phi function = the number of positive integers less than $p^2$ (i.e., $1, 2, \ldots, (p^2-1)$) that are relative prime to $p^2$.

The value of r2 can be selected randomly by selecting a generator g2 of a cyclic group $\mathbb{Z}^*q^2$ of order $\Phi(q^2)$ and selecting a random element s2 from $\Phi(q^2)$ then computing $y2 = (g2)^{s2} \bmod q^2$. $\Phi(q^2)$ is Euler's totient or phi function = the number of positive integers less than $q^2$ (i.e., $1, 2, \ldots, (q^2-1)$) that are relative prime to $q^2$.

To obtain the nth residues, y1 and y2 are raised to the nth power. Thus, $(y1)^n = [(g1)^{s1} \bmod p^2]^n = [(g1)^{s1}]^n \bmod p^2 = (g1^n)^{s1} \bmod p^2$, and $(y2)^n = [(g2)^{s2} \bmod q^2]^n = [(g2)^{s2}]^n \bmod q^2 = (g2^n)^{s2} \bmod q^2$. For reference, $g1^n \bmod p^2$ can be referred to as GN1, and $g2^n \bmod q^2 = $GN2. The results are a fixed based GN1 raised to an exponent of a random s1 $\bmod p^2$ (i.e., $GN1^{s1} \bmod p^2$) and a fixed based GN2 raised to an exponent of a random s2 $\bmod q^2$ (i.e., $GN2^{s2} \bmod q^2$).

Fast encryption 100 pre-computes the values once and only once for each combination of p and q. For simplicity of description, small p and q values are selected as examples. In actual implementations by computing devices or systems, the values of p and q may be 256 bits, 512 bits, 1024 bits, 2048 bits or other numbers of bits in length. For example, in the present example shown below, p=5 and q=7. The foregoing example implementation is applied to the values of p and q, as indicated in the following sequence of operations:

p=5; $p^2$=25

$\mathbb{Z}^*p^2$=(1, 2, 3, 4, 6, 7, 8, 9, 11, 12, 13, 14, 16, 17, 18, 19, 21, 22, 23, 24)

$\Phi(p^2)$=size of $\mathbb{Z}^*p^2$=20 g1 of $p^2$={1: 1, 2: 20, 3: 20, 4: 10, 5: 2, 6: 5, 7: 4, 8: 20, 9: 10, 10: 2, 11: 5, 12: 20, 13: 20, 14: 10, 15: 2, 16: 5, 17: 20, 18: 4, 19: 10, 20: 2, 21: 5, 22: 20, 23: 20, 24: 2}, with the maximum order being 20. The generator g1 can be (2, 3, 8, 12, 13, 17, 22, or 23).

g1=2, for example.

q=7; $q^2$=49

$\mathbb{Z}^*q$=(1, 2, 3, 4, 5, 6, 8, 9, 10, 11, 12, 13, 15, 16, 17, 18, 19, 20, 22, 23, 24, 25, 26, 27, 29, 30, 31, 32, 33, 34, 36, 37, 38, 39, 40, 41, 43, 44, 45, 46, 47, 48)

$\Phi(q^2)$=size of $\mathbb{Z}^*q^2$=42 g2 of $q^2$={1: 1, 2: 21, 3: 42, 4: 21, 5: 42, 6: 14, 7: 2, 8: 7, 9: 21, 10: 42, 11: 21, 12: 42, 13: 14, 14: 2, 15: 7, 16: 21, 17: 42, 18: 3, 19: 6, 20: 14, 21: 2, 22: 7, 23: 21, 24: 42, 25: 21, 26: 42, 27: 14, 28: 2, 29: 7, 30: 3, 31: 6, 32: 21, 33: 42, 34: 14, 35: 2, 36: 7, 37: 21, 38: 42, 39: 21, 40: 42, 41: 14, 42: 2, 43: 7, 44: 21, 45: 42, 46: 21, 47: 42, 48: 2}, with the maximum order being 42. The generator g2 can be (3, 5, 10, 12, 17, 24, 26, 33, 38, 40, 45, or 47).

g2=3, for example.

n=pq=35; $n^2 = 35^2 = 1225$

GN1=$g1^n \bmod p^2 = 2^{35} \bmod 25 = 18$

GN2=$g2^n \bmod q^2 = 3^{35} \bmod 49 = 19$

After pre-computing the above constant values, fast encryption 100 can encrypt any data or message m into ciphertext c using, for example, the following algorithm.

EQ2 is $c = (1+nm)(e) \bmod n^2$, and the "$(r^n) \bmod n^2$" portion can be computed using the CRT (Chinese Remainder Theorem) on $GN1^{s1} \bmod p^2$ and $GN2^{s2} \bmod q^2$.

Let $D = (1+nm) \bmod n^2$. Accordingly, the computation of D is basically one multiplication in terms of the highest computational cost (e.g., in time and/or resource consumption).

The operations of selecting a random element s1 from $\Phi(p^2)$ and selecting a random element s2 from $\Phi(q^2)$ as performed are negligible in terms of computational cost.

Compute $E = GN1^{s1} \bmod p^2$ and $F = GN2^{s2} \bmod q^2$. The computational cost is basically two exponentiation operations with fixed base. Fixed base exponentiation can be accelerated via methods of addition chains, and especially Pippenger's Exponentiation Algorithm.

Fast encryption 100 performs the computation using the CRT to combine E and F to yield a result $H = (r^n) \bmod n^2$. The computational cost does not include performing any exponentiation operation.

Then, fast encryption 100 computes $c = DH \bmod n^2$.

For example, as shown in FIG. 2, fast encryption 100 may encrypt a message M1 to produce a ciphertext C1. M1=12 (i.e., m=12). Using the pre-computed constants GN1 and GN2 (based on p=5 and q=7), fast encryption 100 selects and/or computes the following:

D=(1+nm) mod $n^2$=(1+35×12) mod $35^2$=421
s1=7 and s2=9 (selected randomly)
E=$GN1^{s1}$ mod $p^2$=$18^7$ mod 25=7
F=$GN2^{s2}$ mod $q^2$=$19^9$ mod 49=48
H may be computed using the following two equations.
x=7 mod 25
x=48 mod 49
H=832
C1=DH mod $n^2$=421×832 mod 1225=1147

If data to be encrypted by fast encryption 100 is larger or longer than the amount that can be encrypted at a time (e.g., m∈$\mathbb{Z}$n) the data may be broken into segments to meet the condition that each segment ∈$\mathbb{Z}$n. The resulting ciphertexts can be concatenated. In the reverse process or decryption process, the concatenated ciphertext can be broken up into individual ciphertexts before decrypting into individual plaintexts. The plaintexts can be concatenated to form the original data.

After fast encryption 100 encrypts M1 to create C1, C1 can be, for example, stored in a database 220 controlled by party A or owner 200. C1 may also be transmitted through path 222 over a network 224 (e.g., a public network or Internet) to, for example, party C 226. Party C may be a third party that provide data store services (e.g., a cloud storage service provider). In some implementations, ciphertext C1 may be transmitted over network 224 for storage or processing by a device or system (not shown) controlled by party A. When party A wants to access M1 or the plaintext data of C1, party A may retrieve C1 from database 220 if stored there or from party C through network 224 and path 228. Regardless of the source of C1, party A can decrypt C1 using decryption engine 230 (or decryption 230).

In contrast with fast encryption 100, a party (e.g., party B) who has access to public key 102 (i.e., without the knowledge of p and q) and only perform encryption using the public key. For example, party A 200 provides public key 102 to party B 250 for party B to encrypt a message M2 into ciphertext C2 to send to party A. M2 can be any value. Party B's encryption engine 260 encrypts M2 using EQ1 c=($g^m$)(e) mod $n^2$. For example, n=35 and g=36, for example. Party B does not know the factors p and q of the composite number n. Encryption engine 260 selects a random r as described above. For example, r=23. For comparison, M2=12 (i.e., m=12). EQ1 becomes C2=($g^m$)($r^n$) mod $n^2$=($36^{12}$)($23^{35}$) mod 1225=522. Party B send C2 to party A. Note that EQ1 does not use the private key 104 (e.g., the factors p and q), or the values λ and/or μ.

Party A's decryption engine 230 can decrypt C1 (i.e., encrypted by fast encryption 100 using private key 104 and public key 102) and C2 (i.e., encrypted by encryption engine 260 of party B using just the public key 102) the same way. Regardless of when C1 and C2 arrive (e.g., separately), C1 and C2 are decrypted independently using the same decryption key or private key 104 (e.g., λ, μ).

For decryption, decryption engine 230 retrieves or computes the following values:
p=5; q=7; n=pq=35; $n^2$=1225
g=n+1=36
λ=lcm(p−1,q−1)=12
μ=$(L(g^\lambda$ mod $n^2))^{-1}$ mod n, where L(u)=(u−1)/n.
μ=$g^\lambda$ mod $n^2$=$36^{12}$ mod $35^2$=421
L(u)=(421−1)/35=12
μ=$(12)^{-1}$ mod 35=3
The private key (λ, μ)=(12, 3).
The decryption formula is m=L($c^\lambda$ mod $n^2$)μ mod n.
m=L($c^\lambda$ mod $n^2$)μ mod n=(k)μ mod n, where k=L($c^\lambda$ mod $n^2$), where L(u)=(u−1)/n.

Decryption engine 230 decrypts C1 to obtain the plaintext M1 and decrypts C2 to obtain the plaintext M2. Decryption engine 230 computes the following values to decrypt C1 (C1=1147, produced by fast encryptions 100):
u=$C1^\lambda$ mod $n^2$=$1147^{12}$ mod 1225=141
k=(141−1)/35=4
M1=(k)μ mod n=(4)3 mod 35=12

Decryption engine 230 computes the following values to decrypt C2 (C2=522, produced by encryption engine 260):
u=$C2^\lambda$ mod $n^2$=$522^{12}$ mod 1225=141
k=(141−1)/35=4
M2=(k)μ mod n=(4)3 mod 35=12

The same decryption engine 230 can decrypt ciphertexts C1 and C2 regardless of Cs being encrypted using a fast encryption algorithm and C2 being encrypted using a conventional encryption algorithm.

Figure 3:
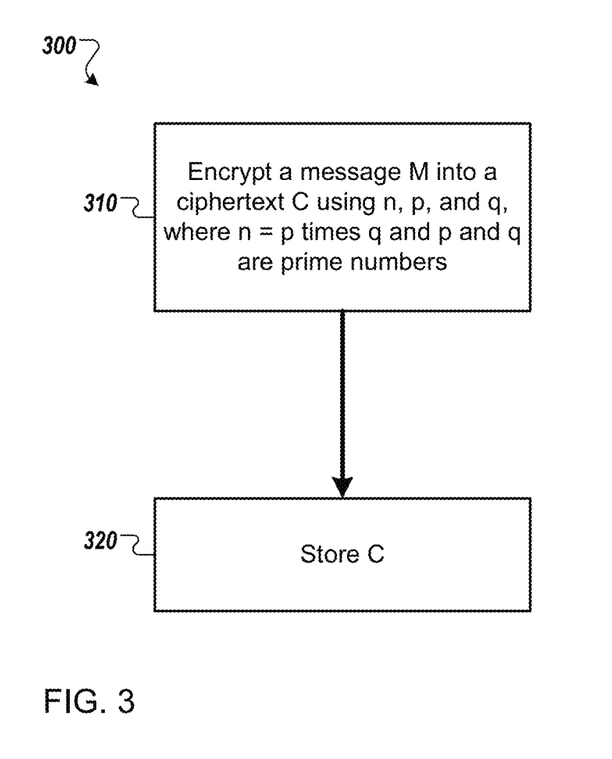
FIG. 3 shows an example of a process implementation.

FIG. 3 shows an example of a process implementation. Process 300 includes, for example, block 310, where fast encryption 100 encrypts data (e.g., M1) into a ciphertext (e.g., C1) using a composite number n=p times q (e.g., public key 102), where p and q may be prime numbers. Fast encryption 100, to speed up encryption operations, also used p and q, components of the private key 104, individually. For example, g1 and GN1 are computed using or based on p, and g2 and GN2 are computed using or based on q. At block 320, the encrypted data (e.g., C1) may be stored (e.g., at database 220) or send to another location or party (e.g., party C).

In some examples, process 300 may be implemented with different, fewer, or more blocks. Process 300 may be implemented as computer executable instructions, which can be stored on a medium, loaded onto one or more processors of one or more computing devices, and executed as a computer-implemented method.

Another example for using the private key in a public key operation is signature verification (e.g., verifying the authenticity of a message or data signed using a digital signature). For example, to create RSA signature keys, generate an RSA key pair containing a modulus N that is the product of two large primes (e.g., p and q), along with integers e and d such that (e)(d) 1 (mod Φ(N)), where Φ is the Euler phi function. The signer's public key consists of N and e, and the signer's private key contains d.

To sign a message m, the signer computes σ=$m^d$ (mod N). To verify a digitally signed message a, the receiver checks that $σ^e$=m (mod N). The party who holds the prime factors p and q (i.e., private key) can implement an RSA signature verification which instead of raising σ to the e-th power mod the composite N, performs the operations mod p and mod q and using CRT to accelerate the computation of the message to the e-th power mod N, similar to the conversion of the "($r^n$) mod $n^2$" portion of EQ2 described above.

For example, the operation of raising σ to the e-th power mod the composite N can be replaced by selecting a random r1 from the nth residue of p and selecting a random r2 from the nth residue of q. Using the CRT, r1 and r2 can be combined to get the eth residue of pq or N. Using the CRT, ($σ^e$) mod N=($σ^e$) mod pq can be converted to $(r1)^e$ mod p and $(r2)^e$ mod q for random r1 and r2, where (r1)(r2)=σ; r1∈$\mathbb{Z}$*p; and r2∈$\mathbb{Z}$*q. The operations continue after computing r1 and r2 as described above.

The same operation is applicable for yet another example of RSA encryption by the party who knows the factors (private key). For example, to verify data or a message that has been digitally signed using a private key, a verification result based on the message may be generated using at least a portion of the private key and the corresponding public key (e.g., by the party knowing the private key). The verification result may be "verified" or "rejected," for example. The result may be stored in, for example, a log or database.

Figure 4:
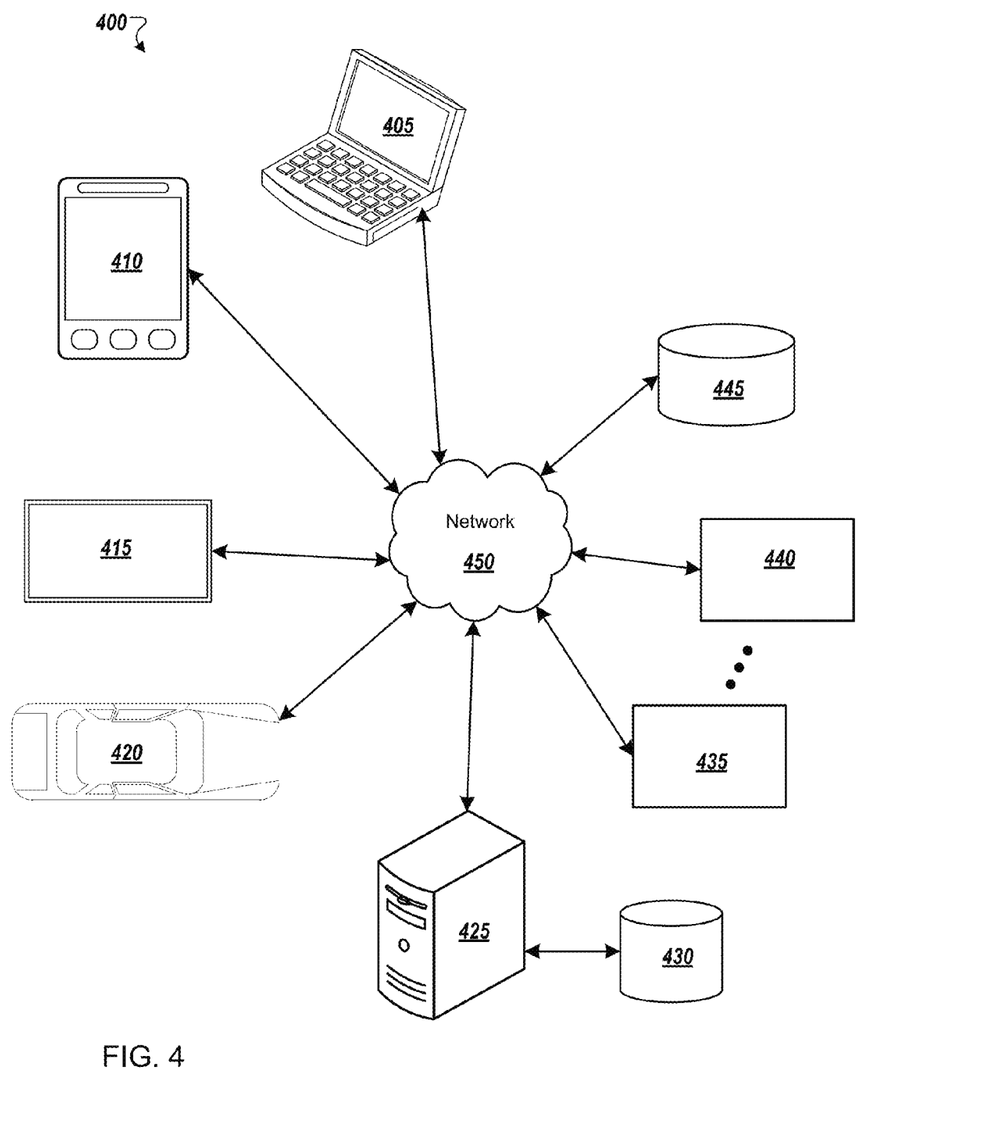
FIG. 4 shows an example environment suitable for some example implementations.

FIG. 4 shows an example environment suitable for some example implementations. Environment 400 includes devices 405-445, and each is communicatively connected to at least one other device via, for example, network 460 (e.g., by wired and/or wireless connections). Some devices may be communicatively connected to one or more storage devices 430 and 445.

An example of one or more devices 405-445 may be computing device 505 described below in FIG. 5. Devices 405-445 may include, but are not limited to, a computer 405 (e.g., a laptop computing device), a mobile device 410 (e.g., smartphone or tablet), a television 415, a device associated with a vehicle 420, a server computer 425, computing devices 435-440, storage devices 430 and 445.

In some implementations, devices 405-420 may be considered user devices (e.g., devices used by users to access data, such as data stored with a cloud storage service provider). Devices 425-445 may be devices associated with service providers (e.g., used by service providers to provide services and/or store data, such as storing encrypted webpages, text, text portions, images, image portions, audios, audio segments, videos, video segments, and/or information thereabout).

For example, a user (e.g., Alice) may use device 405 or 410 to send encrypted data to a storage provider supported by one or more devices 425-445. Alice may encrypt the data using a private key to save computing time and/or resources. The encrypted data cannot be decrypted by the storage provider. When Alice wants to access the data, Alice retrieves the data (e.g., in encrypted form) from the storage provider and decrypts the data on Alice's device 405 or 410.

Figure 5:
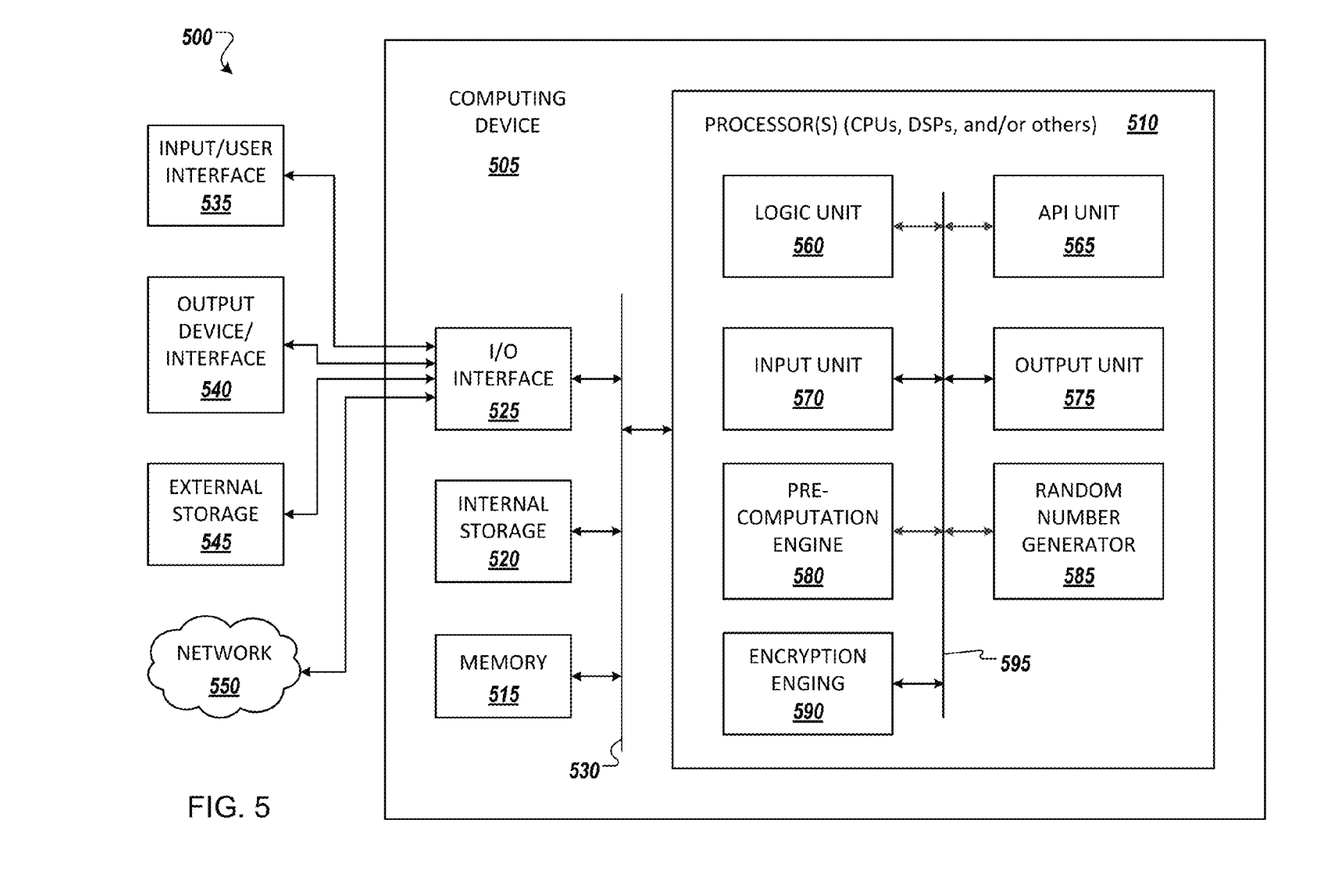
FIG. 5 shows an example computing environment with an example computing device suitable for use in some example implementations.

FIG. 5 shows an example computing environment with an example computing device suitable for use in some example implementations. Computing device 505 in computing environment 500 can include one or more processing units, cores, or processors 510, memory 515 (e.g., RAM, ROM, and/or the like), internal storage 520 (e.g., magnetic, optical, solid state storage, and/or organic), and/or I/O interface 525, any of which can be coupled on a communication mechanism or bus 530 for communicating information or embedded in the computing device 505.

Computing device 505 can be communicatively coupled to input/user interface 535 and output device/interface 540. Either one or both of input/user interface 535 and output device/interface 540 can be a wired or wireless interface and can be detachable. Input/user interface 535 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 540 may include a display, television, monitor, printer, speaker, braille, or the like. In some example implementations, input/user interface 535 and output device/interface 540 can be embedded with or physically coupled to the computing device 505. In other example implementations, other computing devices may function as or provide the functions of input/user interface 535 and output device/interface 540 for a computing device 505.

Examples of computing device 505 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 505 can be communicatively coupled (e.g., via I/O interface 525) to external storage 545 and network 550 for communicating with any number of networked components, devices, and systems, including one or more computing devices of the same or different configuration. Computing device 505 or any connected computing device can be functioning as, providing services of, or referred to as a server, client, thin server, general machine, special-purpose machine, or another label.

I/O interface 525 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 500. Network 550 can be any network or combination of networks (e.g., the Internet, local area network, wide area network, a telephonic network, a cellular network, satellite network, and the like).

Computing device 505 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 505 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 510 can execute under any operating system (OS) (not shown), in a native or virtual environment. One or more applications can be deployed that include logic unit 560, application programming interface (API) unit 565, input unit 570, output unit 575, pre-computation engine 580, random number generator 585, encryption engine 590, and inter-unit communication mechanism 595 for the different units to communicate with each other, with the OS, and with other applications (not shown). For example, pre-computation engine 580, random number generator 585, and encryption engine 590 may implement one or more processes shown and described in FIGS. 1-4. The described units and elements can be varied in design, function, configuration, or implementation and are not limited to the descriptions provided.

In some example implementations, when information or an execution instruction is received by API unit 565, it may be communicated to one or more other units (e.g., logic unit 560, input unit 570, output unit 575, pre-computation engine 580, random number generator 585, and encryption engine 590). For example, after input unit 570 has detected a message M, input unit 570 may use API unit 565 to communicate the message M to pre-computation engine 580. pre-computation engine 580 checks to ensure that constants and/or values needed in encryption operations are available. If not, pre-computation engine 580 generates or pre-computes these constants and/or values. Pre-computation engine 580 then calls encryption engine 590 to encrypt M. Encryption engine 590 calls random number generator 585, if needed, to generate the s1 and s2 random numbers for use in encryption. After encryption engine 590 encrypted M into a ciphertext C, encryption engine 590 passes C to output unit 575, which may interacts with i/o interface 525 to store C or transmit it on a network.

In some instances, logic unit 560 may be configured to control the information flow among the units and direct the services provided by API unit 565, input unit 570, output unit 575, pre-computation engine 580, random number generator 585, and encryption engine 590 in some example implementations described above. For example, the flow of one or more processes or implementations may be controlled by logic unit 560 alone or in conjunction with API unit 565.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer-implemented method, comprising:
    receiving a plaintext for encryption into a ciphertext;
    encrypting the plaintext into a ciphertext, where the encrypting uses both a public key and a corresponding private key, the public key and the corresponding private key generated as a public/private key pair; and
    storing the ciphertext;
    wherein the public key comprises a composite number n, and the private key is generated using prime numbers p and q, and n=p*q;
    wherein the encrypting the plaintext into the ciphertext comprises:
        determining s1 and s2, where said s1 is a random number based on said p, and said s2 is a random number based on said q; and
        calculating a value r using said s1, said s2, and the Chinese Remainder Theorem, where $r \in \mathbb{Z}^*n^2$.

2. The method of claim 1, wherein the encrypting that uses the corresponding private key comprising using g1 and g2, where said g1 is a generator of a cyclic group associated with said p, and said g2 is a generator of a cyclic group associated with said q.

3. The method of claim 2, wherein the encrypting that uses the corresponding private key further comprising using GN1 and GN2, where said GN1 is a constant based on said g1, and said GN2 is a constant based on said g2.

4. A non-transitory computer readable medium having stored therein computer executable instructions for:
    receiving a plaintext for encryption into a ciphertext;
    encrypting the plaintext into a ciphertext, where the encrypting uses both a public key and a corresponding private key, the public key and the corresponding private key generated as a public/private key pair; and
    storing the ciphertext;
    wherein the public key comprises a composite number n, and the private key is generated using prime numbers p and q, and n=p*q;
    wherein the encrypting the plaintext into the ciphertext comprises:
        determining s1 and s2, where said s1 is a random number based on said p, and said s2 is a random number based on said q; and
        calculating a value r using said s1, said s2, and the Chinese Remainder Theorem, where $r \in Z^*n^2$.

5. The computer readable medium of claim 4, wherein the encrypting that uses the corresponding private key comprising using g1 and g2, where said g1 is a generator of a cyclic group associated with said p, and said g2 is a generator of a cyclic group associated with said q.

6. The computer readable medium of claim 5, wherein the encrypting that uses the corresponding private key further comprising using GN1 and GN2, where said GN1 is a constant based on said g1, and said GN2 is a constant based on said g2.

7. At least one computing device comprising a memory and a computer processor configured to perform:
    receiving a plaintext for encryption into a ciphertext;
    encrypting the plaintext into a ciphertext, where the encrypting uses both a public key and a corresponding private key, the public key and the corresponding private key generated as a public/private key pair; and
    storing the ciphertext in the memory;
    wherein the public key comprises a composite number n, and the private key is generated using prime numbers p and q, and n=p*q;
    wherein the encrypting the plaintext into the ciphertext comprises:
        determining g1 and g2, where said g1 is a generator of a cyclic group associated with said p, and said g2 is a generator of a cyclic group associated with said q; and
        determining GN1 and GN2, where said GN1 is a constant based on said g1, and said GN2 is a constant based on said g2.

8. The at least one computing device of claim 7, wherein the encrypting the plaintext further comprising using s1 and s2, where said s1 is a random number based on said p, and said s2 is a random number based on said q.

9. The at least one computing device of claim 8, wherein the encrypting the plaintext further comprising calculating a value r using said s1, said s2, and the Chinese Remainder Theorem, where $r \in \mathbb{Z}^*n2$.

* * * * *